(12) United States Patent
Sjödin et al.

(10) Patent No.: US 10,962,308 B2
(45) Date of Patent: Mar. 30, 2021

(54) PLATE HEAT EXCHANGER FOR SOLAR HEATING (71) Applicant: ALFA LAVAL CORPORATE AB, Lund (SE)

(72) Inventors: Per Sjödin, Lund (SE); Mats Nilsson, Lund (SE)

(73) Assignee: ALFA LAVAL CORPORATE AB, Lund (SE)

( * ) Notice: Subject to any disclaimer, the term of this patent is extended or adjusted under 35 U.S.C. 154(b) by 184 days.

(21) Appl. No.: 16/324,391

(22) PCT Filed: Aug. 24, 2017

(86) PCT No.: PCT/EP2017/071346
§ 371 (c)(1),
(2) Date: Feb. 8, 2019

(87) PCT Pub. No.: WO2018/041715
PCT Pub. Date: Mar. 8, 2018

(65) Prior Publication Data
US 2019/0178586 A1 Jun. 13, 2019

(30) Foreign Application Priority Data

Aug. 30, 2016 (EP) .................................... 16186362

(51) Int. Cl.
*F24S 10/50* (2018.01)
*F28F 3/12* (2006.01)
*F28F 3/04* (2006.01)

(52) U.S. Cl.
CPC .............. *F28F 3/12* (2013.01); *F24S 10/503* (2018.05); *F24S 10/504* (2018.05); *F28F 3/046* (2013.01); *Y02E 10/44* (2013.01)

(58) Field of Classification Search
CPC .......... F28F 3/12; F24S 10/503; F24S 10/504; F24J 2/05
(Continued)

(56) References Cited

U.S. PATENT DOCUMENTS 2,448,648 A * 9/1948 Zideck ................. F24S 10/503
165/170
4,007,726 A 2/1977 Kenchel
(Continued)

FOREIGN PATENT DOCUMENTS

CN 1391075 A 1/2003
CN 201359387 Y 12/2009
(Continued)

OTHER PUBLICATIONS

International Search Report (PCT/ISA/210) issued in PCT/EP2017/071346, dated Oct. 12, 2017.
(Continued)

*Primary Examiner* — Avinash A Savani
(74) *Attorney, Agent, or Firm* — Birch, Stewart, Kolasch & Birch, LLP (57) ABSTRACT

A plate heat exchanger for solar heating includes a plurality of channels extending between an inlet and an outlet for conducting a heat transferring fluid. The plurality of channels is defined between a first plate and a second plate, the first and second plates being formed by stainless steel. Each of the plurality of channels has a single-curved extension between the inlet and the outlet as seen in a plane corresponding to the major surface extension of the first and second plates. Each of the plurality of channels has along at least a portion of its longitudinal extension a triangular or a chamfered triangular cross-section or a parallelogram or a chamfered parallelogram cross-section. The side walls of two adjacent channels define an angle α corresponding to, or (Continued)

smaller than, 100 degrees and more preferred smaller than 90 degrees.

20 Claims, 6 Drawing Sheets

(58) Field of Classification Search
USPC .................................. 126/684, 675; 165/152
See application file for complete search history.

(56) References Cited

U.S. PATENT DOCUMENTS

| | | | |
|---|---|---|---|
| 4,007,728 A | | 2/1977 | Guba |
| 4,315,497 A | | 2/1982 | Vardey |
| 4,346,693 A | | 8/1982 | Wagner et al. |
| 5,531,217 A | | 7/1996 | Louw |
| 6,357,396 B1 | * | 3/2002 | Stansfield ............ F28D 21/0008 122/7 R |
| 7,044,207 B1 | * | 5/2006 | Guidat ...................... F28F 3/14 165/170 |
| 7,258,162 B2 | * | 8/2007 | Shibata ................. F28D 9/0037 165/166 |
| 2011/0277750 A1 | * | 11/2011 | Peguero .................. F24S 10/20 126/675 |
| 2013/0032320 A1 | * | 2/2013 | Shikazono .............. F28F 3/046 165/175 |
| 2014/0123697 A1 | * | 5/2014 | Ito ............................ F28F 3/08 62/498 |

FOREIGN PATENT DOCUMENTS

| | | |
|---|---|---|
| CN | 104006549 A | 8/2014 |
| DE | 27 47 188 A1 | 4/1978 |
| DE | 28 37 095 A1 | 3/1980 |
| DE | 102 10 070 A1 | 9/2003 |
| EP | 2 217 866 A2 | 8/2010 |
| EP | 2 404 685 A1 | 1/2012 |
| EP | 1 811 245 B1 | 5/2013 |
| EP | 2 404 685 B1 | 7/2013 |
| JP | 58-26966 A | 2/1983 |
| JP | 58-93684 U | 6/1983 |
| JP | 59-142352 A | 8/1984 |
| JP | 64-35366 U | 3/1989 |
| JP | 2015-102264 A | 6/2015 |
| WO | WO 79/00881 A1 | 11/1979 |

OTHER PUBLICATIONS

Written Opinion (PCT/ISA/237) issued in PCT/EP2017/071346, dated Oct. 12, 2017.
English translation of Japanese Office Action for Japanese Application No. 2019-529694, dated Feb. 3, 2020.
English translation of Japanese Office Action dated Jul. 6, 2020, for Japanese Application No. 2019-529694.

* cited by examiner

PLATE HEAT EXCHANGER FOR SOLAR HEATING

FIELD OF THE INVENTION

The invention relates to a plate heat exchanger for solar heating, and use of such plate heat exchanger together with a solar reflector.

BACKGROUND OF THE INVENTION

It is well known in the art to provide flat panel solar collectors for heating water or other fluids. The collectors are used in areas of high solar radiation and to improve the efficiency, the rays of light may be directed onto the collector by using a reflector.

One example of a solar collector is known from U.S. Pat. No. 4,007,726. The collector comprises a member having a hollow interior comprising a panel having an exterior flat surface which is coated with a heat absorbing material. The panel further comprises a plurality of pyramidal reflector bodies projecting from the panel. The reflector bodies are distributed across the surface of the panel. The exterior surfaces of the pyramidal reflector bodies reflect radiation incident thereto toward the flat surfaces of the panel. A fluid that circulates through the hollow member also circulates through the interior of the reflector bodies. Although the solution of this piece of prior art may be held to increase the power efficiency by reflecting the incident rays of light between the plurality of reflector bodies, the surface pattern is very complex to produce by pressing a sheet metal without cracking. Also, it is very hard to control the flow of heat transfer fluid from the inlet to the outlet and also to use the full available heat transfer surface.

EP 1 811 245 B1 discloses another example of a solar collector in which the solar collector is formed by a brazed plate heat exchanger having an upper absorber sheet having a selectively absorbing coating and a lower sheet. One or both sheets are provided with impressions. The two sheets are joined by brazing to thereby delimit one or several channels. In case of one channel, the channel may be meander shaped. Also examples of a plurality of parallel channels are disclosed. This type of solar collector corresponds more or less to a traditional single flow plate heat exchanger in its design and allows a controlled throughput of heat transfer fluid. However, the efficiency is low in terms of using the available energy of the incident rays of light.

SUMMARY OF THE INVENTION

It is an object of the present invention to solve at least some of the problems mentioned above.

More precisely it is an object to provide a solar collector providing a well controlled throughput of heat transferring fluid. Another aspect is that the available heat transfer area of the solar collector should be used in a controlled manner. Yet another object is that the solar collector should be easy to produce and also to a low cost.

According to a first aspect the invention relates to a plate heat exchanger for solar heating comprising an inlet and an outlet, and a plurality of channels extending between the inlet and the outlet for conducting a heat transferring fluid between the inlet and the outlet, wherein the plurality of channels are defined between a first plate and a second plate, the first and second plates being formed by stainless steel; each of the plurality of channels has a single-curved extension between the inlet and the outlet as seen in a plane corresponding to the major surface extension of the first and second plates; each of the plurality of channels along at least a portion of its longitudinal extension has a triangular or a chamfered triangular cross-section or a parallelogram or a chamfered parallelogram cross-section; and the side walls of two adjacent channels define an angle corresponding to, or smaller than, 100 degrees and more preferred smaller than 90 degrees.

The plate heat exchanger is intended to be used together with a solar reflector that reflects solar light onto the surface of the plate heat exchanger. The solar energy will thereby heat the heat transferring fluid flowing through the channels between the inlet and the outlet. By the plate heat exchanger comprising a plurality of channels of a single-curved extension the available area defined by the boundaries of the heat exchanger may be covered to a large extent while also ensuring a large throughput of fluid. Also, the fluid flow will be very well controlled. Trials have shown that by the present invention the fluid temperature as measured at the outlet of each channel will be substantially the same, indicating an even efficiency across all channels. By the side walls of two adjacent channels defining an angle corresponding to, or being smaller than 100 degrees and more preferred smaller than 90 degrees, the rays of light reflected onto the plate heat exchanger will, when meeting one of the side walls of the single curved channel be reflected by said one sidewall and then hit the opposite side wall. Depending on the angle of incidence of the ray of light, the light will be further reflected within and along the single curved extension of the channel. Hence, the residence time of the ray of light may be increased and thereby the heat transfer between the ray of light and heat transferring fluid. As yet another advantage, as an effect of the plurality of channels, the plate thickness may be reduced as compared to when using a pyramidal pattern without the material cracking during pressing. Furthermore, the dimensions of the plate heat exchanger can be made smaller than previously known plate heat exchangers to be used with a solar reflector. This will save material, cost and space.

Two of the plurality of channels may have the same curvature or different curvature.

A first group of channels as seen on a first side along a symmetry line extending between the inlet and the outlet and a second group of channels as seen on a second side along the symmetry line may be mirrored with respect to each other. This symmetry is advantageous when using the plate heat exchanger since the installation may be simplified.

The plurality of channels may be arranged to diverge with respect to the inlet and arranged to converge with respect to the outlet.

The single-curved extension may comprise a first straight portion and a second straight portion, each merging into a single-curved portion. The first straight portion and the second straight portion may have the same length. This facilitates provision of symmetry.

The maximum width of a channel further away from the symmetry line between the inlet and the outlet may be larger than the maximum width of a channel closer to said symmetry line. Thereby an even flow distribution and residence time may be provided across all channels.

In case each of the plurality of channels along at least a portion of its longitudinal extension has a chamfered triangular cross-section or a chamfered parallelogram cross-section, the chamfering may extend parallel to the plane corresponding to the major surface extension of the first and second plates. The chamfered cross section of the channels contributes to the provision of an even flow distribution across all channels and thereby that the full available heating area is evenly used. The chamfering also facilitates the pressing.

The channels of the first and/or the second plates may be formed by deep drawing a flat sheet billet, and the deep drawing may be made to such extent that a surface enlargement as measured across an area delimited by the outermost boundary lines of the outermost channels on opposing sides of the symmetry line is at least 120% as compared to a non-pressed flat sheet billet. The surface enlargement results in an enlarged available heat transferring area that may improve the efficiency of the heat exchanger.

Each of the plurality of channels may along its longitudinal extension between the inlet and the outlet further have a single curved extension as seen in a direction transverse the plane corresponding to the major surface extension of the first and second plates, and as seen in parallel with an imaginary line extending between the centers of the inlet and the outlet, and each channel may have a maximum depth halfway its longitudinal extension. Thus the pressed area as a whole will be slightly domed. This profile has shown to provide a surface enlargement of the heat transferring area that results in an even flow distribution between all channels and which also facilitates pressing.

The first and the second plates may be identical, or alternatively the plurality of channels may be arranged in the first plate whereas the second plate is flat.

At least the first plate may be blackened by using a paint or by using a surface modification.

The plate heat exchanger may be permanently joined by brazing, welding, bonding or gluing.

According to another aspect the invention refers to use of the plate heat exchanger as described above together with a solar reflector.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claims, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

These and other aspects of the present invention will now be described in more detail, with reference to the appended drawings showing embodiments of the invention. The figures are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1A:
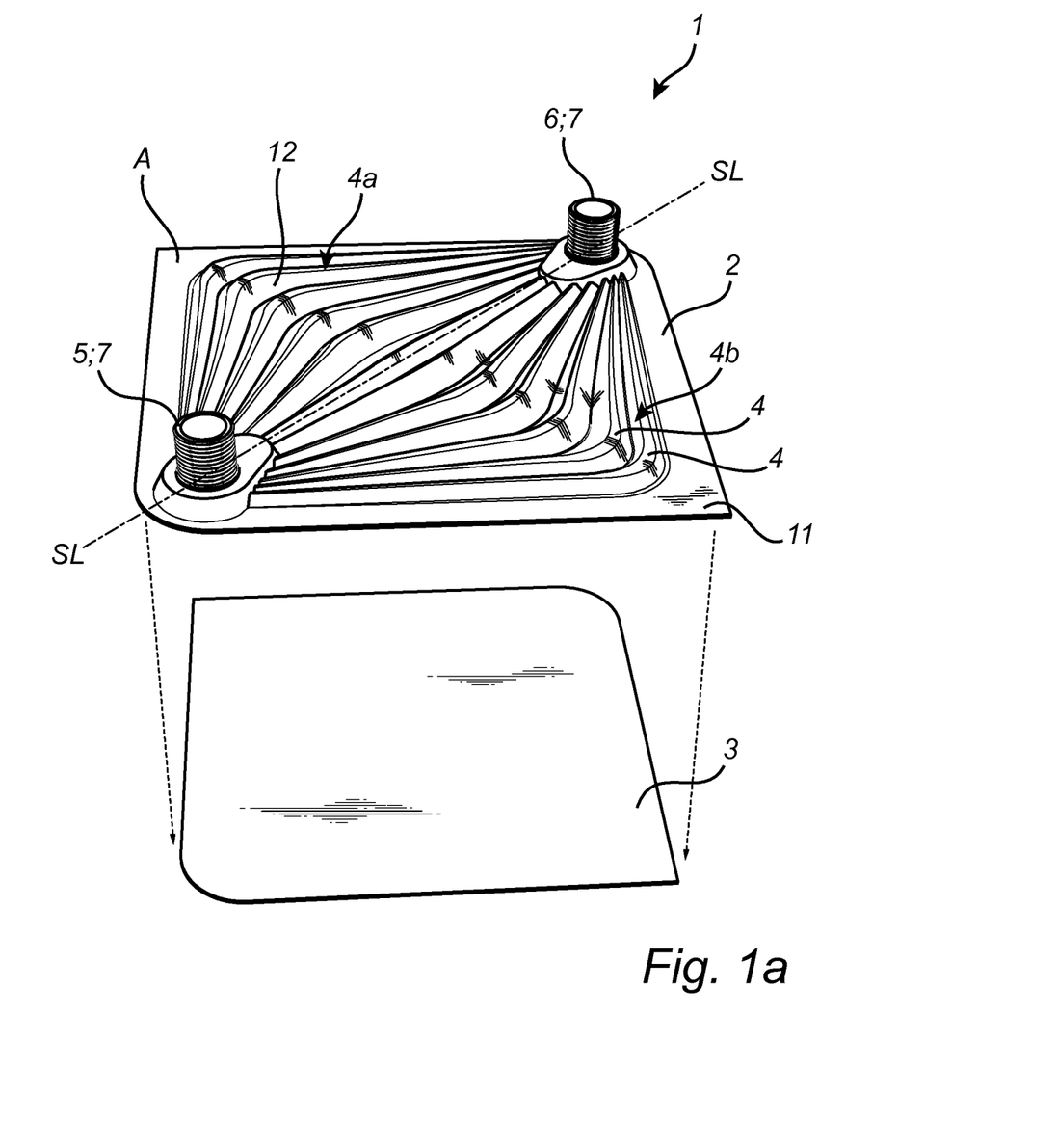
FIGS. 1a and 1b disclose schematically a first embodiment of the inventive plate heat exchanger.
Figure 1B:
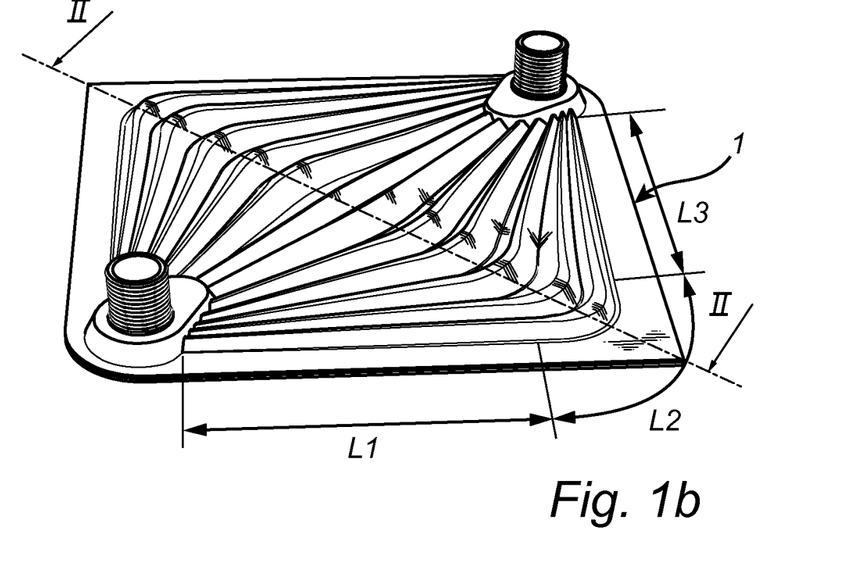

Starting with FIGS. 1a and 1b the general design of a first embodiment of the plate heat exchanger 1 is disclosed.

The plate heat exchanger 1 comprises an upper first plate 2 and a lower second plate 3, both made of sheet metal. The first plate 2 is provided with a pressed pattern comprising a plurality of channels 4 and the second plate 3 is flat. The plurality of channels 4 in the first plate 2 are surrounded by an essentially flat circumferential brim 11.

The material may by way of example be stainless steel. It is however to be understood that other materials may be used. The two plates 2, 3 are disclosed as quadratic, however other geometries are possible, such as rectangular, oval or circular.

The first plate 2 is provided with a plurality of channels 4 for conducting a heat transferring fluid between a common inlet 5 and a common outlet 6. The inlet 5 and outlet 6 are provided with fittings 7 brazed or welded to the first plate 2. The fittings 7 extend in a direction normal to a plane A corresponding to the major surface extension of the first and second plates 2, 3. The plurality of channels 4 are arranged to diverge with respect to the common inlet 5 and arranged to converge with respect to the common outlet 6.

A symmetry line SL coincides with an imaginary line extending between the centers of the inlet 5 and the outlet 6. A first group of channels 4a are arranged on a first side along the symmetry line SL and a second group of channels 4b are arranged on a second side along the symmetry line SL. The two groups of channels 4a, 4b are mirrored with respect to each other.

Each of the plurality of channels 4 has a single-curved extension between the inlet 5 and the outlet 6 as seen in plane A. The single-curved extension has a first straight portion L1 and a second straight portion L3, each merging into a single-curved portion L2. In the disclosed embodiment the first straight portion L1 and the second straight portion L3 have the same length. It is however to be understood that the straight portions L1, L3 may have different lengths. In the disclosed embodiment the curvature of the plurality of channels have different curvatures. It is however to be understood they may have the same curvature.

Figure 2:
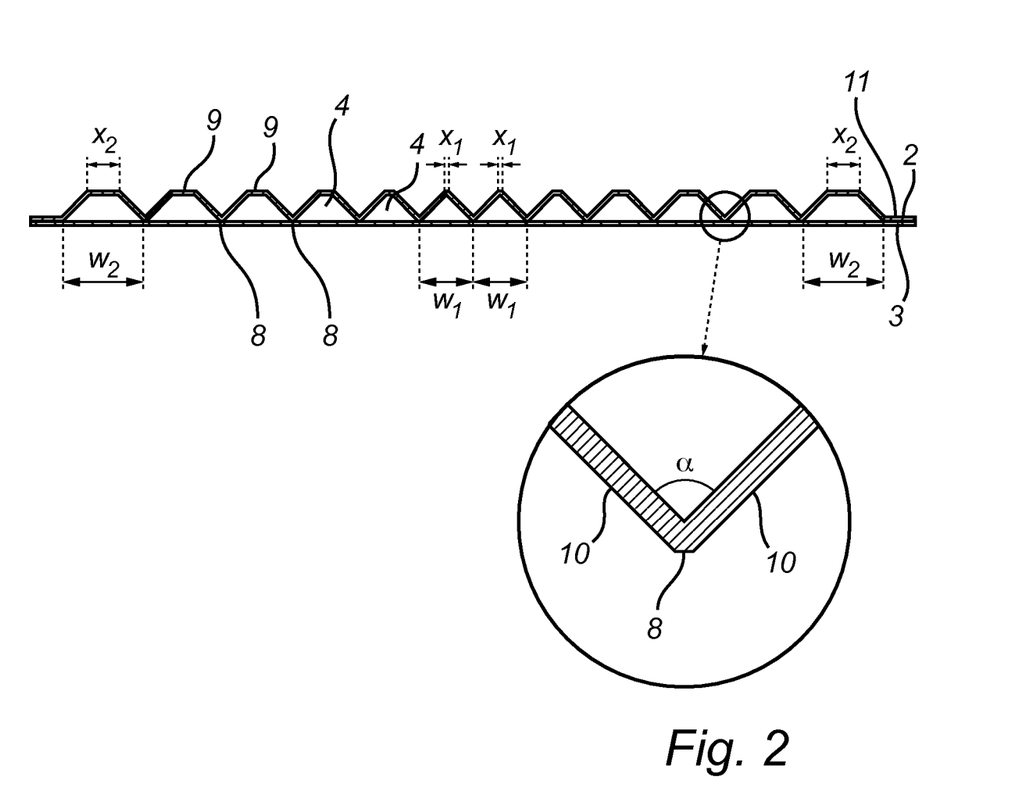
FIG. 2 discloses a cross section II-II of the first embodiment of the inventive plate heat exchanger.

Now turning to FIG. 2, the width w of a single channel differs along its extension between the inlet 5 and the outlet 6. In the context of the application the width w is measured transverse the longitudinal extension of a channel 4 between the centre points of two valleys 8 formed between two adjacent channels 4. In the disclosed embodiment the channels 4 are widest along a mid portion, i.e. along the central portion L2 while narrowing towards its respective inlet/outlet 5, 6.

Also, the width w of the plurality of channels differs. The maximum width w2 of a channel 4 further away from the symmetry line SL is larger than the maximum width w1 of a channel 4 closer to the symmetry line.

Each of the plurality of channels 4 has along at least a portion of its longitudinal extension a chamfered triangular cross-section. The width x of the chamfering 9 varies along the longitudinal extension of an individual channel. The maximum width x2 of a chamfering 9 further away from the symmetry line SL is larger than the maximum width x1 of a chamfering closer to said symmetry line SL. The chamfered surfaces of the plurality of channels are arranged to be in level with each other.

The side walls 10 of two adjacent channels 4 define an angle α corresponding to, or smaller than, 100 degrees and more preferred smaller than 90 degrees. The bottom of each valley 8 formed between two adjacent channels is arranged to be in level with the second plate 3 when the first plate 2 is arranged on top of the second plate 3.

The first and second plates 2, 3 are permanently joined, preferably by brazing or welding, e.g. laser welding which as such are joining methods well known to the skilled person. Also adhesive bonding may be used. The first plate 2 is arranged on top of the second plate 3 with the valleys 8 of the plurality of channels 4 and the brim 11 abutting the flat second sheet 3. When subjecting the arrangement to heat, the two panels 2, 3 will join permanently and form a plurality of fluid tight channels 4. The joining will occur along abutting contact surfaces, i.e. along the valleys 8 and along the brim 11. In case of laser welding or adhesive bonding it may be advantageous to increase the contact surface along the valleys 8 by slightly flattening the same.

The fittings 7 may be mounted at the same time or in a separate step.

Figure 3A:
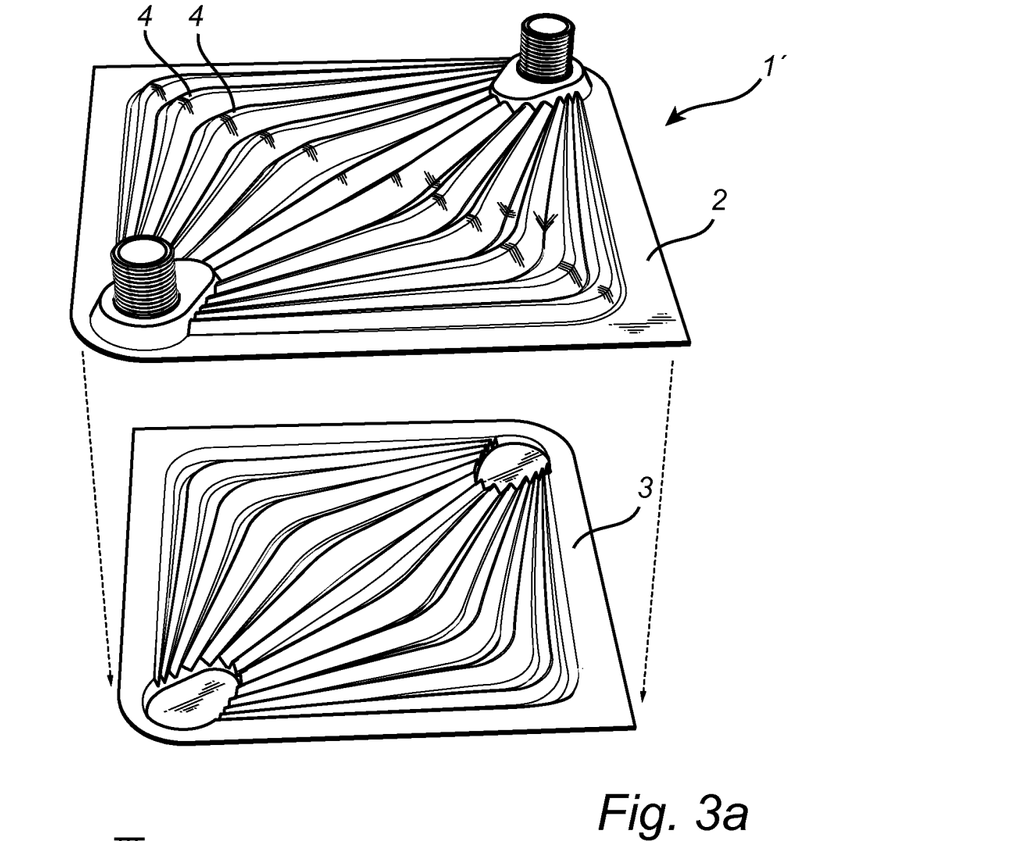
FIG. 3a and FIG. 3b disclose schematically a second embodiment of the inventive plate heat exchanger.
Figure 3B:
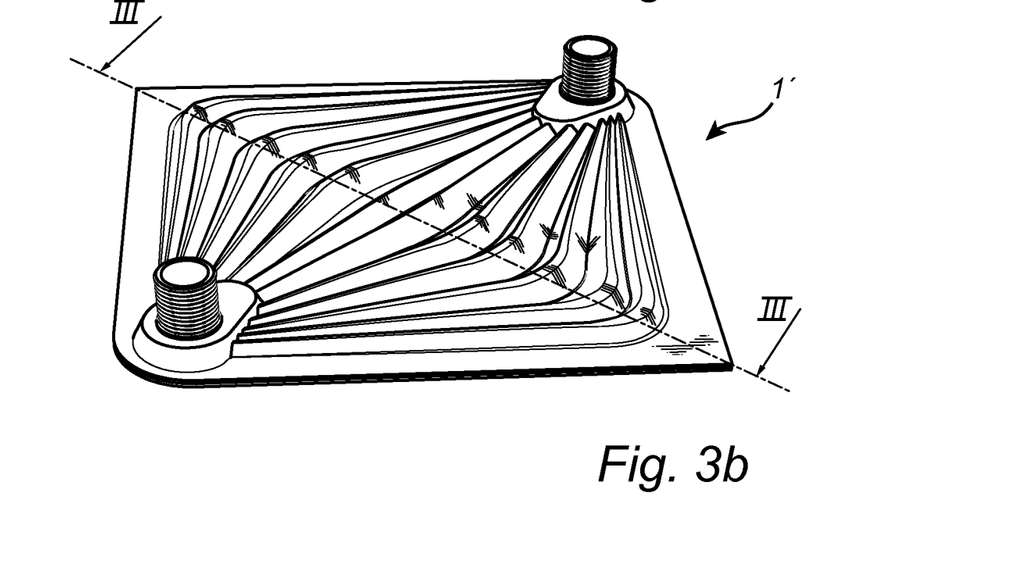
Figure 4:
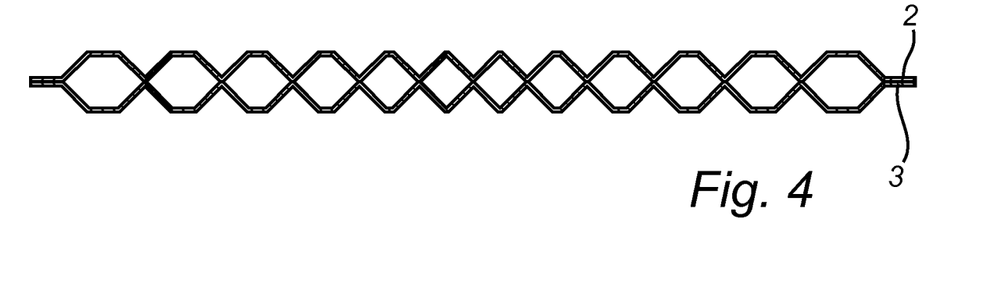
FIG. 4 discloses a cross section III-Ill of the second embodiment of the inventive plate heat exchanger.

Now turning to FIGS. 3a, 3b and 4 a second embodiment of the plate heat exchanger 1' is disclosed. This embodiment differs from the first embodiment in that the first and second plates 2, 3 i.e. the upper and lower plates are identical. As a consequence thereof the plurality of channels 4 will instead of having a chamfered triangular cross-section have a chamfered parallelogram cross-section, see FIG. 4. In applications where the temperature of the fluid and/or the plate heat exchanger itself becomes high, a symmetrical construction of the plates is especially advantageous. In this embodiment the plate heat exchanger is symmetrical in three directions, i e in line with the connections, 90 degrees to said line and in a direction 90 degrees to the plates, 2 and 3. Thanks to the symmetrical pattern and construction the plates may have a high resistance to thermal fatigue due to high temperatures.

Figure 5:
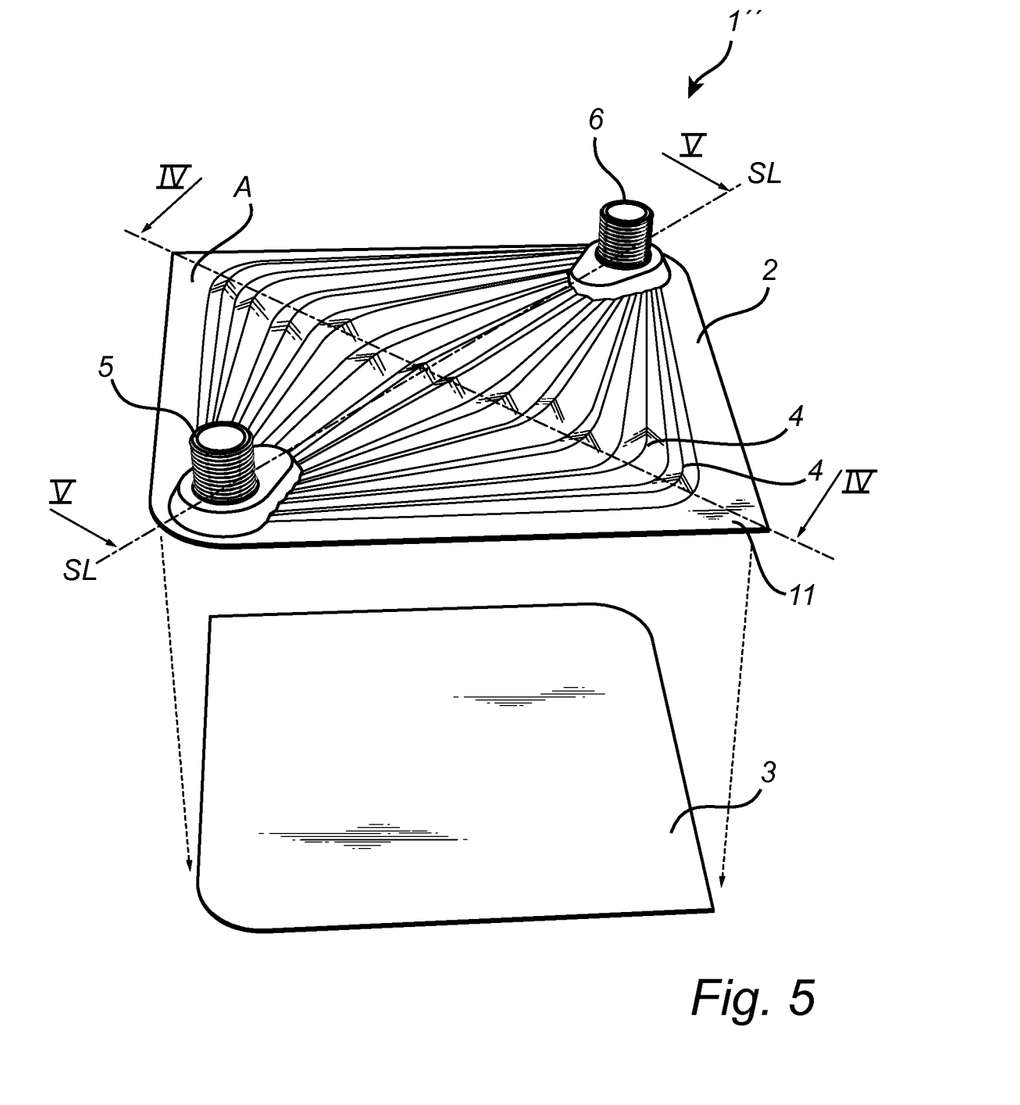
FIG. 5 discloses schematically a third embodiment of the inventive heat exchanger.

Now turning to FIG. 5 a third embodiment of the plate heat exchanger 1" is disclosed. The first plate 2 is provided with a plurality of channels 4 for conducting a heat transferring fluid between a common inlet 5 and a common outlet 6. The second plate 3 is disclosed as flat, although it is to be understood that the second plate may be identical with the first plate 2.

Figure 6A:
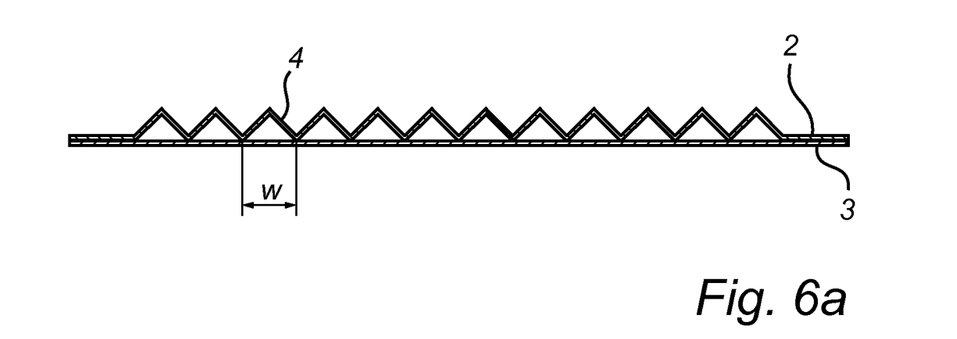
FIG. 6a discloses a cross section IV-IV of the third embodiment of the inventive plate heat exchanger.

As is illustrated in FIG. 6a, the channels 4 in this embodiment do each have a triangular cross section as seen transverse the longitudinal extension of the channels 4.

The width w of a single channel differs along its extension between the inlet 5 and the outlet 6. In the disclosed embodiment the channels 4 are widest along a mid portion while narrowing towards its respective inlet/outlet 5, 6.

Figure 6B:
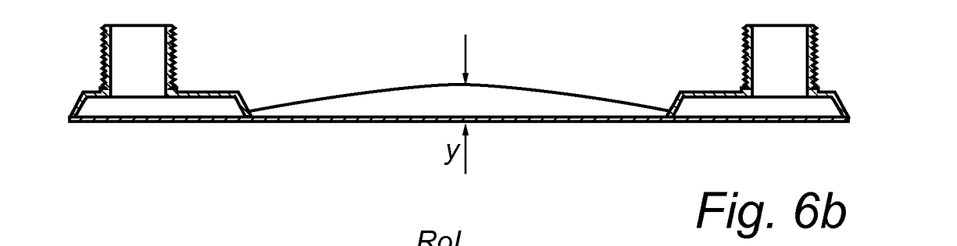
FIG. 6b discloses a cross section V-V of the third embodiment of the inventive plate heat exchanger.

As illustrated in FIG. 6b each of the plurality of channels has along its longitudinal extension between the inlet 5 and the outlet 6 a single curved extension as seen in a direction transverse plane A. The single curved extension provides each channel 4 with a maximum depth y halfway its longitudinal extension. The curvature is highly exaggerated. Also, each channel 4 preferably has the same single curved extension as seen in this direction meaning that the upper most points of each channels 4 preferably are in level with each other as seen transverse the longitudinal extension of the plurality of channels.

Figure 7:
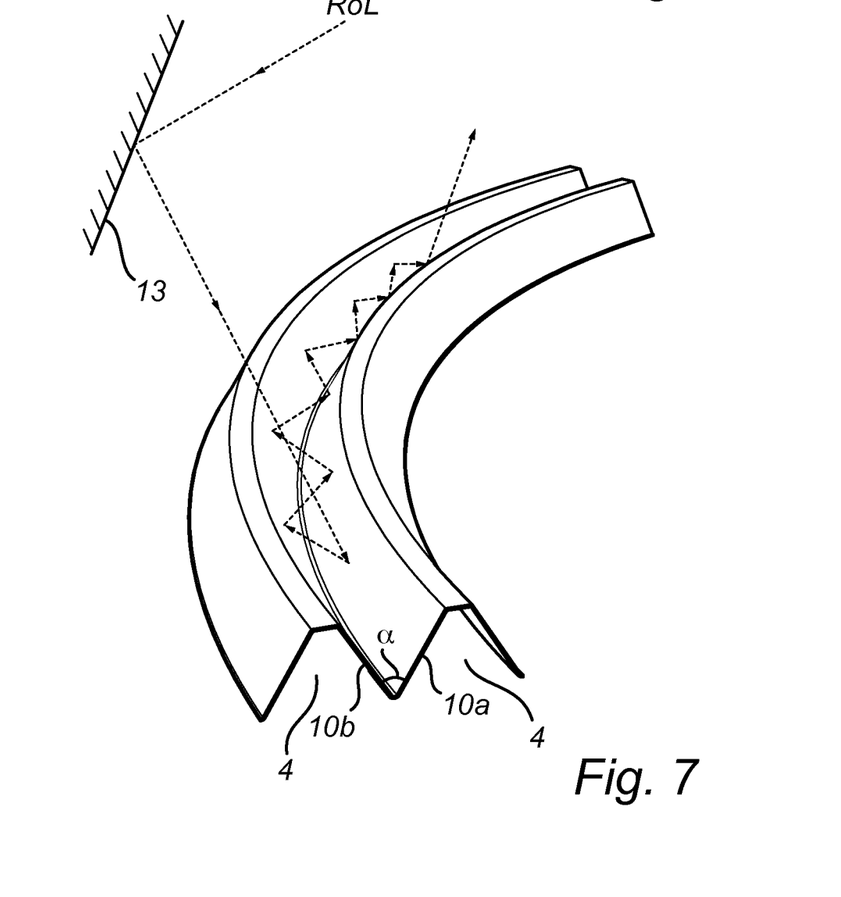
FIG. 7 discloses highly schematic the plurality of channels interacting with an incoming ray of light.

Now turning to FIG. 7, the effect of the plurality of single-curved channels 4 arranged adjacent each other will be discussed. By the side walls 10 of two adjacent channels 4 defining an angle α corresponding to, or being smaller than 100 degrees and more preferred smaller than 90 degrees, an incident ray of light RoL from a reflector 13 may be reflected by a first side wall 10a towards the opposite second side wall 10b, which in turn will reflect it back towards the first side wall 10a. This repeated reflection may depending on the curvature and the angle of incidence improve the energy exchange between the ray of light RoL and the heat transferring fluid inside the two channels 4 concerned. It is to be understood that either the plate heat exchanger 1; 1', 1" or the reflector (not disclosed) may be arranged to be angularly adjustable to optimize capture of incoming light.

Figure 8:
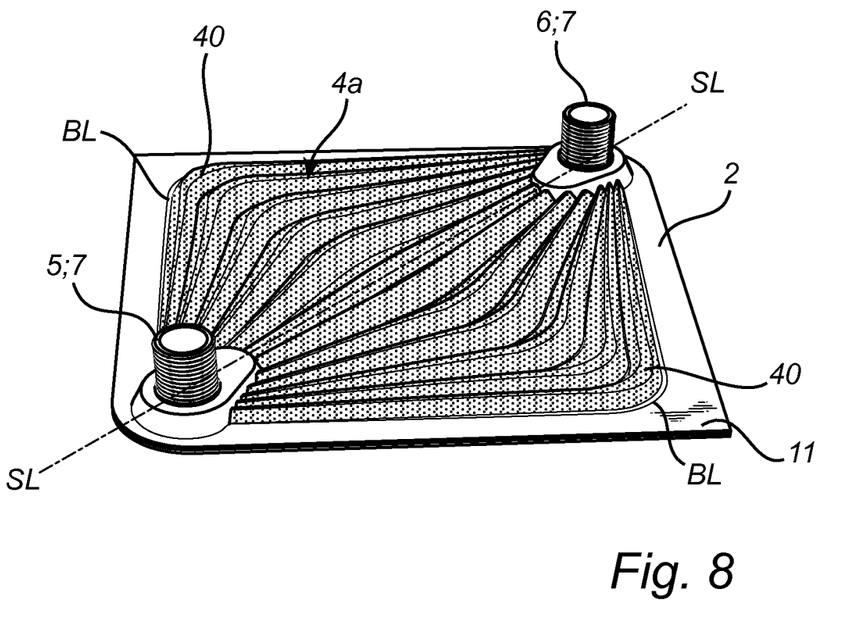
FIG. 8 discloses highly schematically the essential heat transferring area.

Now turning to FIG. 8, it is preferred no matter embodiment that the channels 4 of the first and/or the second plates 2 are formed by deep drawing. It is preferred that the deep drawing is made to such extent that a surface enlargement as measured across an area delimited by the outermost boundary lines BL of the outermost channels 40 on opposing sides of the symmetry line SL is at least 120% as compared to a non-pressed flat sheet billet (not disclosed). The area, which corresponds to the essential heat transferring surface during operation of the plate heat exchanger, is illustrated in grayscale in FIG. 8.

Non-limiting examples of heat transferring fluid are water or thermal oil.

To improve the heat absorption, the exterior surface 12 of the first plate 2 may at least partly be provided with black paint. Black paint is preferably used for applications having temperatures below 200° C. For temperatures above 200° C., which is typically the case when using thermal oil, the paint may be replaced by a surface modification. The surface modification may by way of example be provided by laser machining resulting in a surface pattern, such as pyramids, reflecting the light towards the surface. The surface modification may be made before or after pressing.

The permanent joining of the two plates 2, 3 may be made by brazing or welding, e.g. laser welding. Copper brazing may be used for applications below 225° C., which is the limit for copper brazing due to creep resistance. For applications of higher temperatures, the plate material may be stainless steel or high temperature stainless steel. The brazing may be performed by using nickel based braze fillers, iron based braze fillers or melting point depressants. The braze fillers or melting point depressants may be applied by rolling or screen printing of the contact surfaces between the plates. As yet another alternative an intermediate flat plate (not disclosed) may be screen printed with a bonding material and arranged between the first and second plates 2, 3. It goes without saying that such intermediate flat plate must be provided with openings for the fluid flow. Also, such intermediate flat plate will also function as a mechanical reinforcement.

In the disclosed embodiments the plurality of channels 4 covers a quadratic area. It is preferred that the area has a geometry corresponding to the projection area from a reflector. By projection area is meant the area onto which a reflector is arranged to reflect incoming rays of lights onto the plate heat exchanger. Examples of other geometries are circular, oval or rectangular. As a non-limiting example a quadratic plate heat exchanger could have a size as measured along the outer periphery of 30×30 cm.

Variations to the disclosed embodiments can be understood and effected by the skilled person in practicing the claimed invention, from a study of the drawings, the disclosure, and the appended claims.

The invention claimed is:

1. A plate heat exchanger for solar heating comprising:
   an inlet;
   an outlet; and
   a plurality of channels extending between the inlet and the outlet for conducting a heat transferring fluid between the inlet and the outlet,
   wherein the plurality of channels are defined between a first plate and a second plate, the first and second plates being formed by stainless steel,
   wherein each of the plurality of channels has a single-curved extension between the inlet and the outlet as seen in a plane corresponding to a major surface extension of the first and second plates,
   wherein each of the plurality of channels along at least a portion of a longitudinal extension thereof has a triangular or a chamfered triangular cross-section or a parallelogram or a chamfered parallelogram cross-section,
   wherein the side walls of two adjacent channels define an angle corresponding to, or smaller than, 100 degrees, and
   wherein the plurality of channels is arranged to diverge with respect to the inlet and is arranged to converge with respect to the outlet.

2. The plate heat exchanger according to claim 1, wherein two of the plurality of channels have a same curvature or a different curvature.

3. The plate heat exchanger according to claim 1, wherein a first group of channels as seen on a first side along a symmetry line extending between the inlet and the outlet and a second group of channels as seen on a second side along the symmetry line are mirrored with respect to each other.

4. The plate heat exchanger according to claim 1, wherein the single-curved extension comprises a first straight portion and a second straight portion, each of the first and second straight portions merging into a single-curved portion.

5. The plate heat exchanger according to claim 4, wherein the first straight portion and the second straight portion have a same length.

6. The plate heat exchanger according to claim 1, wherein a maximum width of a channel further away from a symmetry line extending between the inlet and the outlet is larger than a maximum width of a channel closer to said symmetry line.

7. The plate heat exchanger according to claim 1, wherein, in case each of the plurality of channels along at least a portion of the longitudinal extension has a chamfered triangular cross-section or a chamfered parallelogram cross-section, the chamfering extends parallel to the plane corresponding to the major surface extension of the first and second plates.

8. The plate heat exchanger according to claim 1, wherein the channels of the first and/or the second plates are formed by deep drawing a flat sheet billet, and wherein the deep drawing is made to such extent that a surface enlargement as measured across an area delimited by outermost boundary lines of the outermost channels on opposing sides of a symmetry line extending between the inlet and the outlet is at least 120% as compared to a non-pressed flat sheet billet.

9. The plate heat exchanger according to claim 1, wherein each of the plurality of channels along a longitudinal extension between the inlet and the outlet further has a single curved extension as seen in a direction transverse to a plane corresponding to the major surface extension of the first and second plates and as seen in parallel with an imaginary line extending between centers of the inlet and the outlet, and wherein each channel has a maximum depth halfway along the longitudinal extension.

10. The plate heat exchanger according to claim 1, wherein the first and the second plates are identical, or wherein the plurality of channels is arranged in the first plate and wherein the second plate is flat.

11. The plate heat exchanger according to claim 1, wherein at least the first plate is blackened by using a paint or by using a surface modification.

12. The plate heat exchanger according to claim 1, wherein the plate heat exchanger is permanently joined by brazing, welding, bonding or gluing.

13. A method comprising the step of using a plate heat exchanger together with a solar reflector, the plate heat exchanger comprising:
   an inlet;
   an outlet; and
   a plurality of channels extending between the inlet and the outlet for conducting a heat transferring fluid between the inlet and the outlet,
   wherein the plurality of channels are defined between a first plate and a second plate, the first and second plates being formed by stainless steel,
   wherein each of the plurality of channels has a single-curved extension between the inlet and the outlet as seen in a plane corresponding to a major surface extension of the first and second plates,
   wherein each of the plurality of channels along at least a portion of a longitudinal extension thereof has a triangular or a chamfered triangular cross-section or a parallelogram or a chamfered parallelogram cross-section, and
   wherein the side walls of two adjacent channels define an angle corresponding to, or smaller than, 100 degrees.

14. The plate heat exchanger according to claim 1, wherein said angle is smaller than 90 degrees.

15. The plate heat exchanger according to claim 2, wherein a first group of channels as seen on a first side along a symmetry line extending between the inlet and the outlet and a second group of channels as seen on a second side along the symmetry line are mirrored with respect to each other.

16. The plate heat exchanger according to claim 2, wherein the plurality of channels is arranged to diverge with respect to the inlet and is arranged to converge with respect to the outlet.

17. The plate heat exchanger according to claim 3, wherein the plurality of channels is arranged to diverge with respect to the inlet and is arranged to converge with respect to the outlet.

18. The plate heat exchanger according to claim 2, wherein the single-curved extension comprises a first straight portion and a second straight portion, each of the first and second straight portions merging into a single-curved portion.

19. The plate heat exchanger according to claim 3, wherein the single-curved extension comprises a first straight portion and a second straight portion, each of the first and second straight portions merging into a single-curved portion.

20. A plate heat exchanger for solar heating comprising:
an inlet;
an outlet; and
a plurality of channels extending between the inlet and the outlet for conducting a heat transferring fluid between the inlet and the outlet,
wherein the plurality of channels are defined between a first plate and a second plate, the first and second plates being formed by stainless steel,
wherein each of the plurality of channels has a single-curved extension between the inlet and the outlet as seen in a plane corresponding to a major surface extension of the first and second plates,
wherein each of the plurality of channels along at least a portion of a longitudinal extension thereof has a triangular or a chamfered triangular cross-section or a parallelogram or a chamfered parallelogram cross-section,
wherein the side walls of two adjacent channels define an angle corresponding to, or smaller than, 100 degrees, and
wherein said angle is smaller than 90 degrees.

* * * * *